United States Patent
Hamilton

(10) Patent No.: US 11,015,900 B2
(45) Date of Patent: *May 25, 2021

(54) OPTIC COVER WITH RELEASABLY RETAINED DISPLAY

(71) Applicant: Sheltered Wings, Inc., Barneveld, WI (US)

(72) Inventor: David M. Hamilton, Barneveld, WI (US)

(73) Assignee: SHELTERED WINGS, INC., Middleton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/363,213

(22) Filed: Mar. 25, 2019

(65) Prior Publication Data
US 2019/0219362 A1   Jul. 18, 2019

Related U.S. Application Data

(63) Continuation of application No. 14/742,310, filed on Jun. 17, 2015, now Pat. No. 10,240,897, which is a continuation-in-part of application No. 14/196,251, filed on Mar. 4, 2014, now Pat. No. 9,683,812.

(51) Int. Cl.
*F41G 1/06* (2006.01)
*G02B 23/16* (2006.01)
*F41G 1/38* (2006.01)

(52) U.S. Cl.
CPC .............. *F41G 1/065* (2013.01); *F41G 1/383* (2013.01); *G02B 23/16* (2013.01)

(58) Field of Classification Search
CPC . F41G 1/383; F41G 1/473; F41G 1/04; F41G 1/065; F41G 11/00; G02B 23/16; G02B 27/0006; G02B 7/006
See application file for complete search history.

(56) References Cited

U.S. PATENT DOCUMENTS

| | | |
|---|---|---|
| 2,849,795 A | 9/1958 | Vissing |
| 3,426,433 A | 2/1969 | Anderson |
| 3,826,012 A | 7/1974 | Pachmayr |
| 4,038,757 A | 8/1977 | Hicks et al. |
| 4,285,137 A | 8/1981 | Jennie |
| 4,734,989 A | 4/1988 | Sanders et al. |

(Continued)

FOREIGN PATENT DOCUMENTS

| | | |
|---|---|---|
| FR | 2562680 | 10/1985 |
| WO | 2008/091388 A2 | 11/2008 |

OTHER PUBLICATIONS http://forum.snipershide.info/showthread.php?t=56992, Leopold Retractable Ballistic Chart for 30mm Rifle, Aug. 2010.*

(Continued)

*Primary Examiner* — Benjamin P Lee
(74) *Attorney, Agent, or Firm* — Husch Blackwell LLP

(57) ABSTRACT

A cover for use with an optic device to hold and display shooting information. The cover may have resilient retention members that allow a display to be releasably attached and detached from the cover. The display may be made from a single substrate or multiple substrates in order to make the shooting information contained thereon highly visible in a variety of conditions and shooting preferences. The cover may include a flexible body for securing the cover to optic devices of a variety of sizes.

14 Claims, 11 Drawing Sheets

(56) References Cited

U.S. PATENT DOCUMENTS

| | | |
|---|---|---|
| 4,909,617 A | 3/1990 | Boyd |
| 5,150,528 A | 9/1992 | Shire |
| 5,162,942 A | 11/1992 | Anzai et al. |
| 5,255,120 A | 10/1993 | Anzai et al. |
| 5,299,113 A | 3/1994 | England et al. |
| 5,375,072 A | 12/1994 | Cohen |
| 5,495,676 A | 3/1996 | Chesnut et al. |
| 5,960,576 A | 10/1999 | Robinson et al. |
| 6,279,259 B1 | 8/2001 | Otteman |
| 6,289,625 B1 | 9/2001 | Phares |
| 6,416,189 B1 | 7/2002 | Watson |
| 6,516,699 B2 | 2/2003 | Sammut |
| 6,643,970 B2 | 11/2003 | Huber |
| 6,811,268 B2 | 11/2004 | Watson |
| 6,862,832 B2 | 3/2005 | Barrett et al. |
| 6,862,833 B1 | 3/2005 | Gurtner |
| 7,162,825 B2 | 1/2007 | Ugolini |
| 7,310,904 B2 | 12/2007 | Ugolini et al. |
| 7,484,856 B1 | 2/2009 | Newhall et al. |
| 7,676,137 B2 | 3/2010 | Schick et al. |
| 7,685,760 B1 | 3/2010 | Neumaster |
| 7,717,630 B1 | 5/2010 | Wan |
| 7,721,480 B2 | 5/2010 | Campean |
| 7,832,137 B2 | 11/2010 | Sammut et al. |
| 7,937,878 B2 | 5/2011 | Sammut |
| 7,937,879 B2 | 5/2011 | Hamilton |
| 7,946,072 B2 | 5/2011 | Tsai |
| 8,001,714 B2 | 8/2011 | Davidson et al. |
| 8,166,696 B2 | 5/2012 | Hamilton |
| 8,166,697 B1 | 5/2012 | Sueskind |
| 8,226,251 B1 | 7/2012 | Kreutzig |
| 8,270,104 B2 | 9/2012 | Windauer |
| 8,281,995 B2 | 10/2012 | Bay |
| 8,353,454 B2 | 1/2013 | Sammut |
| 8,656,630 B2 | 2/2014 | Sammut |
| 8,681,267 B2 | 3/2014 | Sale |
| 8,701,330 B2 | 4/2014 | Tubb |
| 8,739,672 B1 | 6/2014 | Kelly |
| 8,893,423 B2 | 11/2014 | Tubb |
| 9,121,672 B2 | 9/2015 | Tubb |
| 9,297,615 B2 | 3/2016 | Meinert |
| 2006/0218841 A1 | 10/2006 | Campean |
| 2007/0137088 A1 | 6/2007 | Peters |
| 2007/0188848 A1 | 8/2007 | Choi et al. |
| 2011/0168777 A1 | 7/2011 | Bay |
| 2012/0186130 A1 | 7/2012 | Tubb |
| 2013/0044252 A1 | 2/2013 | Sale |
| 2014/0110482 A1 | 4/2014 | Bay |
| 2014/0319216 A1 | 10/2014 | Meinert |

OTHER PUBLICATIONS website screenshot captured Dec. 20, 2012 for SCOPE DOPE at www.scopedope.com.
AR15.com Official Mk12 ModO, Mod1, ModH Photo and Discussion Thread pp. 1-11, posted Jul. 29, 2011.
International Search Report of International Appln. No. PCT/US2016/037757 dated Sep. 30, 2016, 3 pages.
http://forum.snipershide.info/showthread.php?t=56992 (webpage), p. 2, Sniper's Hide Forum, see entry #4 mgd45, Aug. 5, 2010.

* cited by examiner

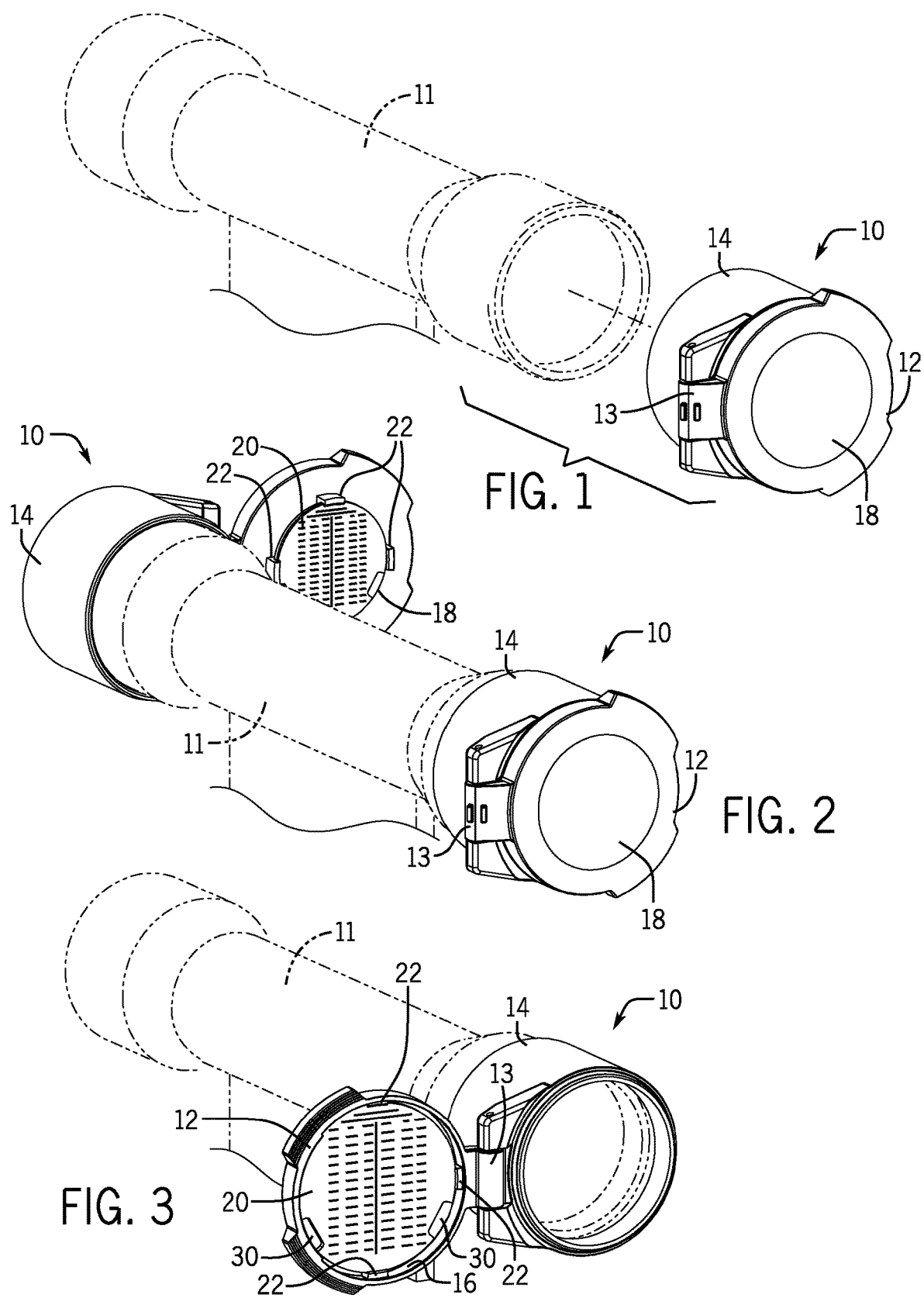

OPTIC COVER WITH RELEASABLY RETAINED DISPLAY

CROSS REFERENCE TO RELATED APPLICATION

This application is a continuation patent application of U.S. patent application Ser. No. 14/742,310 filed Jun. 17, 2015, which is a continuation-in-part of U.S. patent application Ser. No. 14/196,251 filed Mar. 4, 2014 and issued as U.S. Pat. No. 9,683,812 which are incorporated herein by reference for all purposes.

FIELD

The disclosure relates generally to the field of optic sighting devices. More particularly, the disclosure relates to devices and methods for conveniently retaining sighting and other information.

BACKGROUND

Avid shooters, e.g. a hunter, competition shooter, military, law enforcement officer, etc., rely on many different pieces of information in order to make accurate and precise shots. Some information is based upon environmental factors such as distance, minute of angle, elevation hold value, wind hold value, pressure, temperature or elevation. Some information is based upon the equipment being used, for example scope height, muzzle velocity, and/or the ballistic being used, for example bullet class, bullet speed, bullet's ballistic coefficient and bullet drag model, or a combination of these parameters, such as observed bullet drop. This information is commonly referred to in the shooting industry as data on personal equipment, data on previous engagements, or DOPE.

Due to the amount of different DOPE factors that can affect the precision and accuracy of a shot and the variability of the same, keeping track of such DOPE can be challenging for shooters. Some shooters use dope log books to enter the information themselves. Other shooters may use a number of pre-calculated DOPE charts from which a shooter can look up the information needed. Having such information readily available when a shooter is making a shot can also be challenging. In some situations, such as hunting, flipping through pages of a log or book can cause the target to become suspicious and flee. Therefore a need exists for holding such information in a readily accessible location.

To attempt to solve this problem, some shooters have begun cutting portions of their logs or books into a circular or disc shape and taping or gluing them to the inside of their optic covers. Many shooters use an optical device such as, but not limited to a scope, when shooting. In order to protect the lenses of the optical device from scratches, shooters will use covers. Some covers, called flip cap or flip open covers, fit on the end(s) of the optical device and have a cap that can be closed when the optical device is not in use or opened when the shooter intends on using the optical device. When the flip cap is open, the eyepiece of the optical device is available for use by the shooter with the cover's cap off to the side or above the optical device. Since the inside of the cover's cap is available for use and faces the shooter when the cover is open, the inside of the cap is a convenient place to hold a shooter's DOPE.

One company called Scope Dope states that it offers "a quick reference ballistic data disc designed to fit inside the cover of a 'flip-open' riflescope cap . . . made from heavy die cut vinyl." Scope Dope also states that a shooter can then "pre-record critical data using the waterproof permanent pen onto the data disc." The discs offered by Scope Dope can be attached to a cap by using glue or tape.

SUMMARY OF THE INVENTION

As mentioned above, prior attempts to create DOPE displays that can be attached to the inside of a cover cap have not been frilly optimized. Although such DOPE discs allow a shooter to write some information he or she desires onto the disc, such information is limited to the preprinted spaces for specific information. Further, although such a disc can fit many different models of flip cap covers, the disc has to be secured to the cover such as by tape or glue. If a shooter glues the disc to the cover, the disc, and the information on the disc, cannot be changed for changing environmental factors or if a different gun or bullet is used. If a shooter tapes the disc to the cover, the disc may be changed, but the tape will lose its tack from the frequent switching of discs and environmental factors such as moisture or dirt. This can result in the disc falling out of the cover cap and/or requiring the shooter to install a new piece of tape in the cover cap at inconvenient times such as during hunting. Furthermore, the removal of a disc from a cap cover held by tape during some activities, such as hunting, can cause the target to become suspicious and flee.

The applicant has discovered that a need exists for the secure retention of DOPE information at a convenient location, such as the inside of a flip cap cover, and, at the same time, permit such information to be removed and replaced.

In one embodiment, the invention provides a cover for an optical device. The optical device includes a cap and a means for releasably and securely holding a display such that the display can be selectively removed from the means for releasably and securely holding a display. The means for releasably and securely holding a display is permanently attached to the cap.

In another embodiment, the invention provides a cover for an optical device. The optical device includes a body capable of attaching the cover to the optical device. A cap is connected to the body such that the cap can be opened or closed, the cap having an interior portion. The optical device also includes a display with a perimeter and at least one resilient retention member attached to the interior portion of the cap for retaining the display, capable of temporarily deforming to receive and release the display. The display having at least one indent formed in its perimeter such that the display may be released from the at least one resilient retention member at least through use of the at least one indent.

In yet another embodiment, the invention provides a display for shooting firearms with a sighting device having a cover. The cover includes a first substrate having a first color and a second substrate having a second color different than the first color and fixed to the first substrate to form a display. The first substrate is engraved such that the second substrate is exposed through the engraved first substrate and conveys shooting information. The display is shaped such that it may be firmly retained by the cover and has a perimeter formed such that the perimeter may be used to remove the display from the cover.

Another embodiment of the invention provides a cover for an optic device having a flexible body for securing the cover to an optic device, a ring connected to the flexible body, a cap complementary to the ring, the cap operably connected to the ring. The cover may also include a cap having an interior portion that is capable of releasably and securely holding a display and a display including DOPE data.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

BRIEF DESCRIPTION OF THE DRAWINGS

FIG. 1 is an isometric view showing the attachment of an optic cover to a sighting device.

FIG. 2 is an isometric view of a closed optic cover attached to one end of a sighting device and an open optic cover attached to another end of the sighting device.

FIG. 3 an isometric view of an optic cover with the cap open and retaining a display.

DETAILED DESCRIPTION

Figure 4:
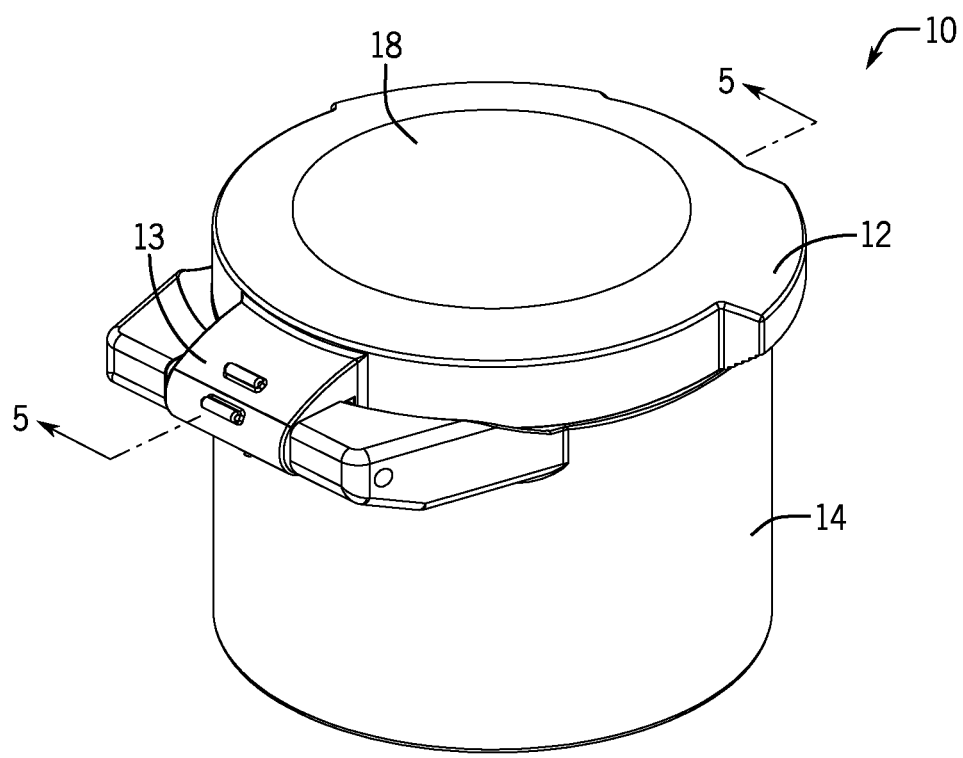
FIG. 4 is an enlarged isometric view of a closed optic cover.

A cover for an optic device in accordance with the present invention helps shooters conveniently and securely releasably retain shooting information on a cap of the optic cover. A display in accordance with the present invention can be securely attached to and detached from the cap of an optic cover to readily display shooting information.

Referring now to FIG. 1, one aspect of the present invention provides a flip cap style cover 10 for an optic device 11 such as a scope or other sighting device. As seen in FIG. 2, a cover 10 can be used on each end of the optic device 11. The cover 10 includes a cap 12 attached to the cover, such as, for example, by a hinge 13 such that the cover can be opened and closed as seen in FIGS. 2 and 3. Other constructions for attaching a cap 12 to a cover 10 are known in the industry, the use of which would not defeat the spirit of the invention. The cover 10 can also include a body 14 for attaching the cover to an optic device 11.

Another embodiment of the invention is a cap 12 as will be described, for attaching to an existing cover body 14 so as to retrofit the cap 12 or cover 10 to any aftermarket optic cover or optic device available.

Figure 5:
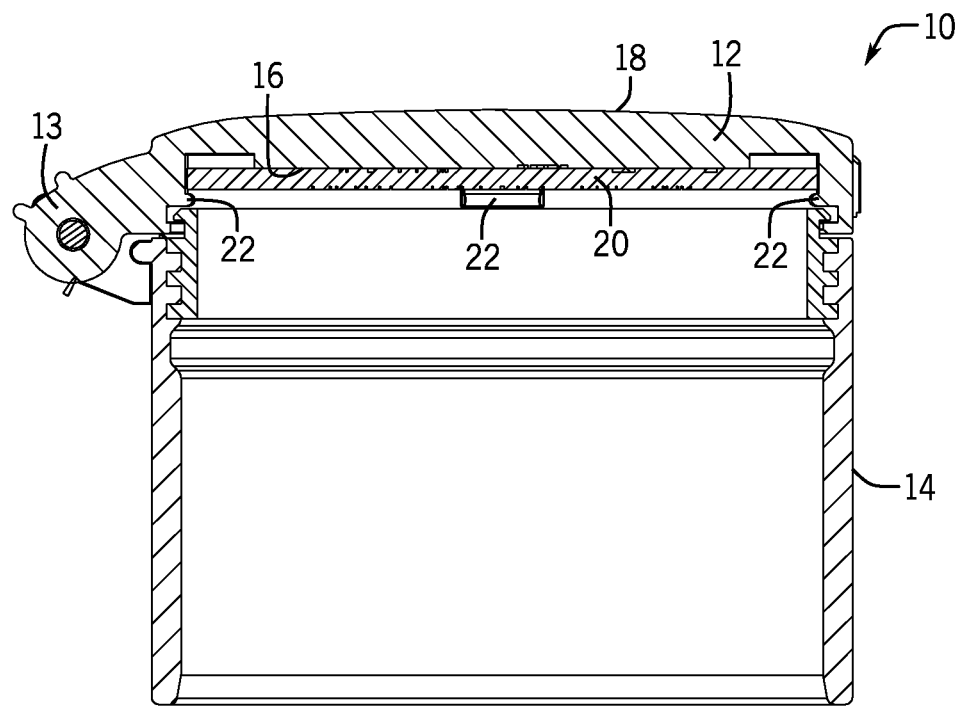
FIG. 5 is a cross-section view of the optic cover of FIG. 4 along the line 5-5.

The cap 12 has an interior portion 16, seen in FIG. 3, and an exterior portion 18, seen in FIG. 4. When the cap 12 is in the closed configuration, such as, when the optic device 11 is not being used, the exterior portion 18 of the cap 12 is exposed to the environment and the interior portion 16 of the cap faces the optic device 11 as seen in FIG. 5.

When the cap 12 is in the open configuration as seen in FIG. 3, such as, when a shooter desires to use the optic device 11, the interior portion 16 of the cap 12 faces the shooter. When using two covers 10, such as shown in FIG. 2, the exterior portion 18 of the cap 12 of the second cover will also face the shooter when open. If the cap of each cover is set up to open in a different direction, both the interior portion 16 of the first cap and the exterior portion 18 of the second cap will be visible to the shooter.

Figure 6:
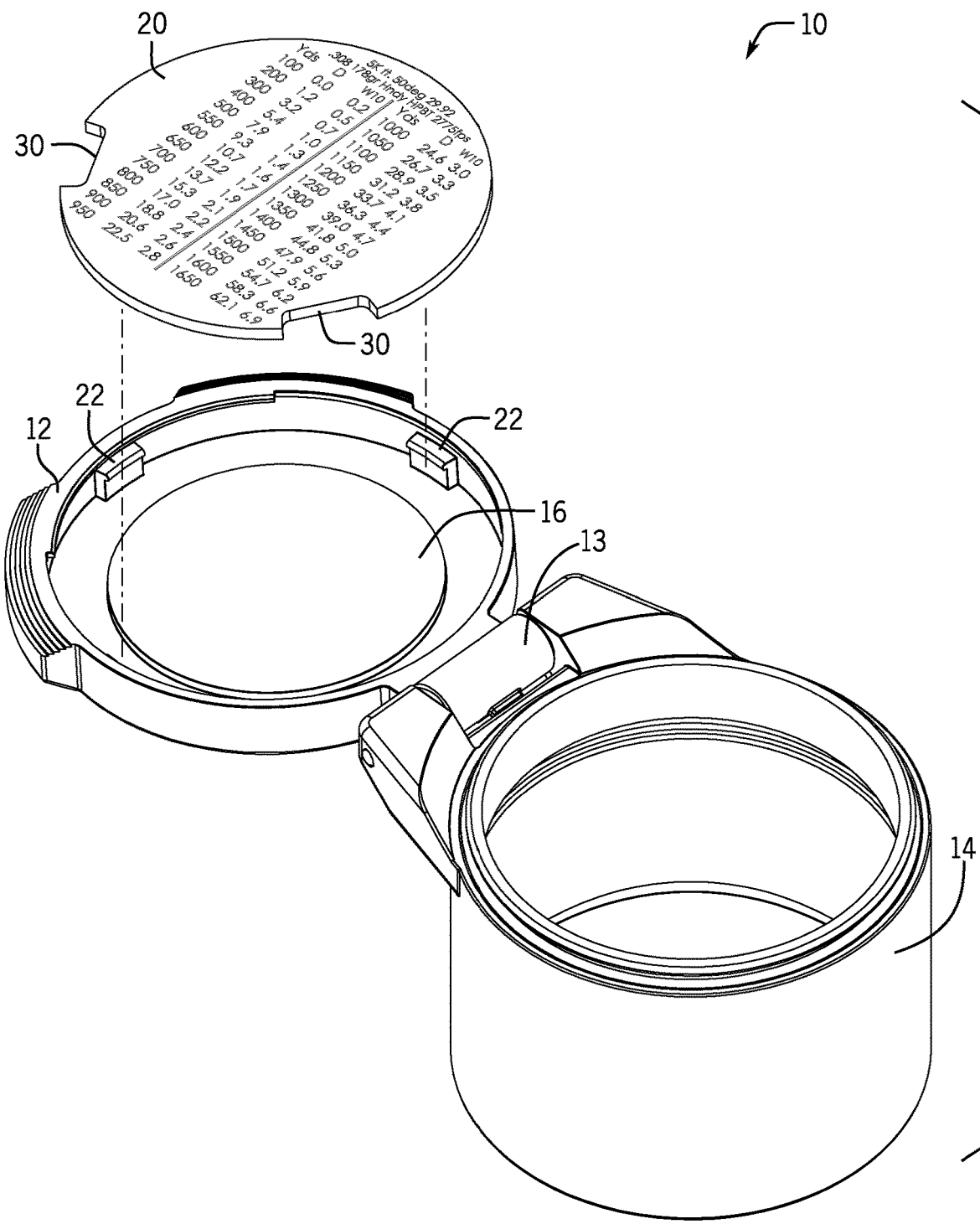
FIG. 6 is an isometric view of an optic cover with the cap open and the display removed.

As shown in FIG. 3, the interior portion 16 of the cap 12 is capable of holding a display 20 which can show information such as DOPE. In one embodiment, the display 20 is round in shape and held by the interior portion 16 of the cap 12 by tabs 22 permanently attached thereto, such as by integrally forming the cap and tabs, which resiliently hold the display 20 in place. (See FIG. 6). For example, the tabs 22 can be made of a resilient plastic that will temporarily deform when sufficient force is applied. To further encourage deformation upon application of pressure, the tops of the tabs 22 could also be angled. Thus, when the display 20 is pushed on the tabs 22, such as by a shooter, the tabs deform to receive the display and allow the display to slide past the deformed tabs and to be seated. Once the display 20 is seated, the tabs 22 retake their original shape and thereby securely hold and firmly retain the display 20 in place. This embodiment provides a balance between ease of removal of the display 20 and securement of display while shooting.

Although the embodiment described above discloses that the interior portion 16 of the cap 12 releasably retains a display 20, the exterior portion 18 of the cap or both the interior portion and the exterior portion could be capable of retaining displays. For example, when a cover 10 is used on each end of an optic device 11, it may be desirable to have the cap 12 from the first cover releasably retain a display 20 on the interior portion 16 and the cap 12 from the second cover releasably retain a display 20 on the exterior portion 18 such that two displays are visible to the shooter when using the optic device.

Figure 7:
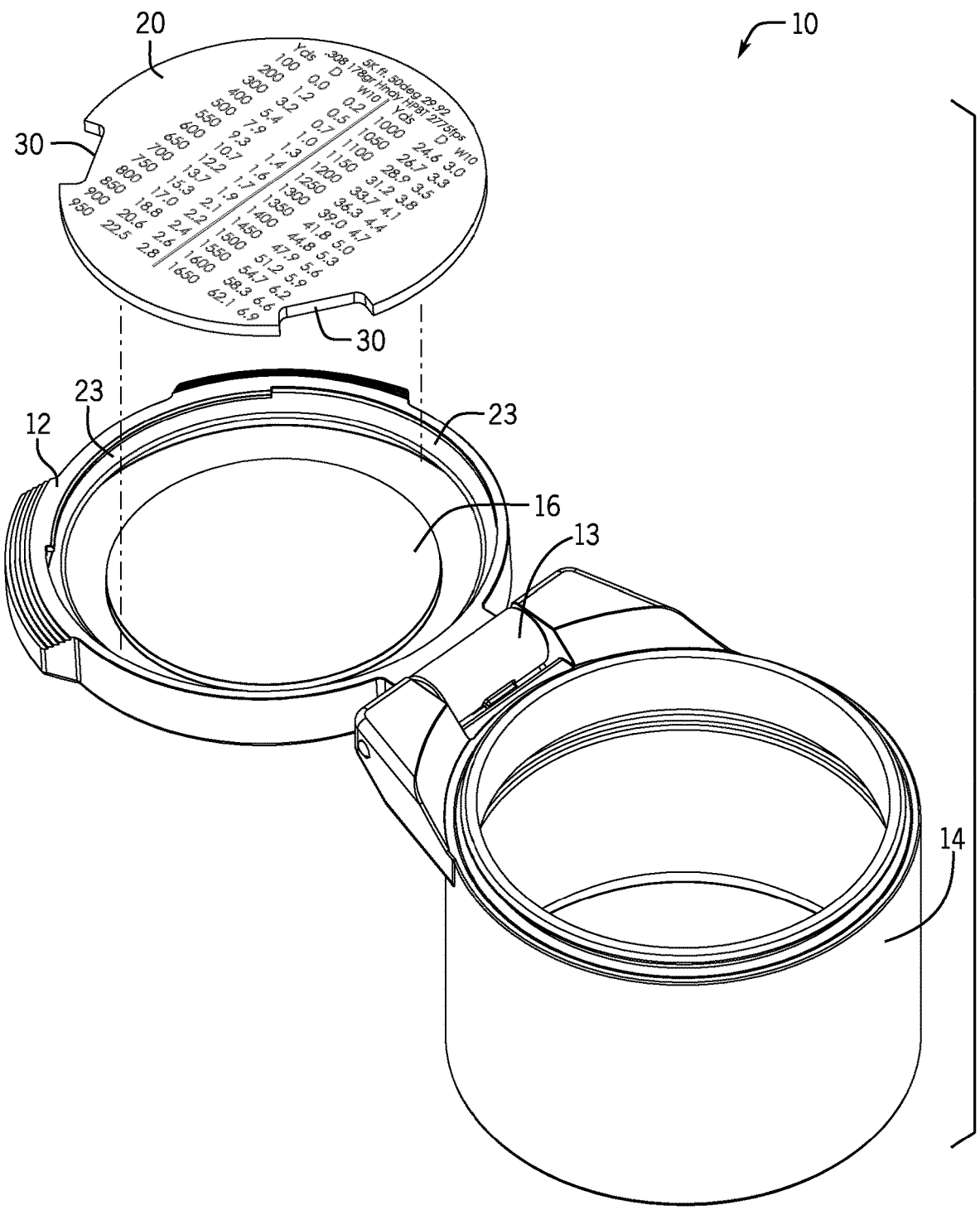
FIG. 7 is an isometric view of an alternative embodiment of an optic cover with the cap open and the display removed.

In another embodiment, the display 20 is held by a resilient annular ridge, ring or flange of the cap 12. As seen in FIG. 7, the annular flange 23 extends along the perimeter of the interior portion 16 of the cap 12. Although the annular flange 23 is shown as a continuous flange, the flange could also be intermittent along the interior portion 16. Similar to the tabs 22 above, the annual flange 23 can be made of a resilient material such that the annular flange will deform when the display 20 is being seated and thereafter retake its original shape to hold the display in place.

Figure 8:
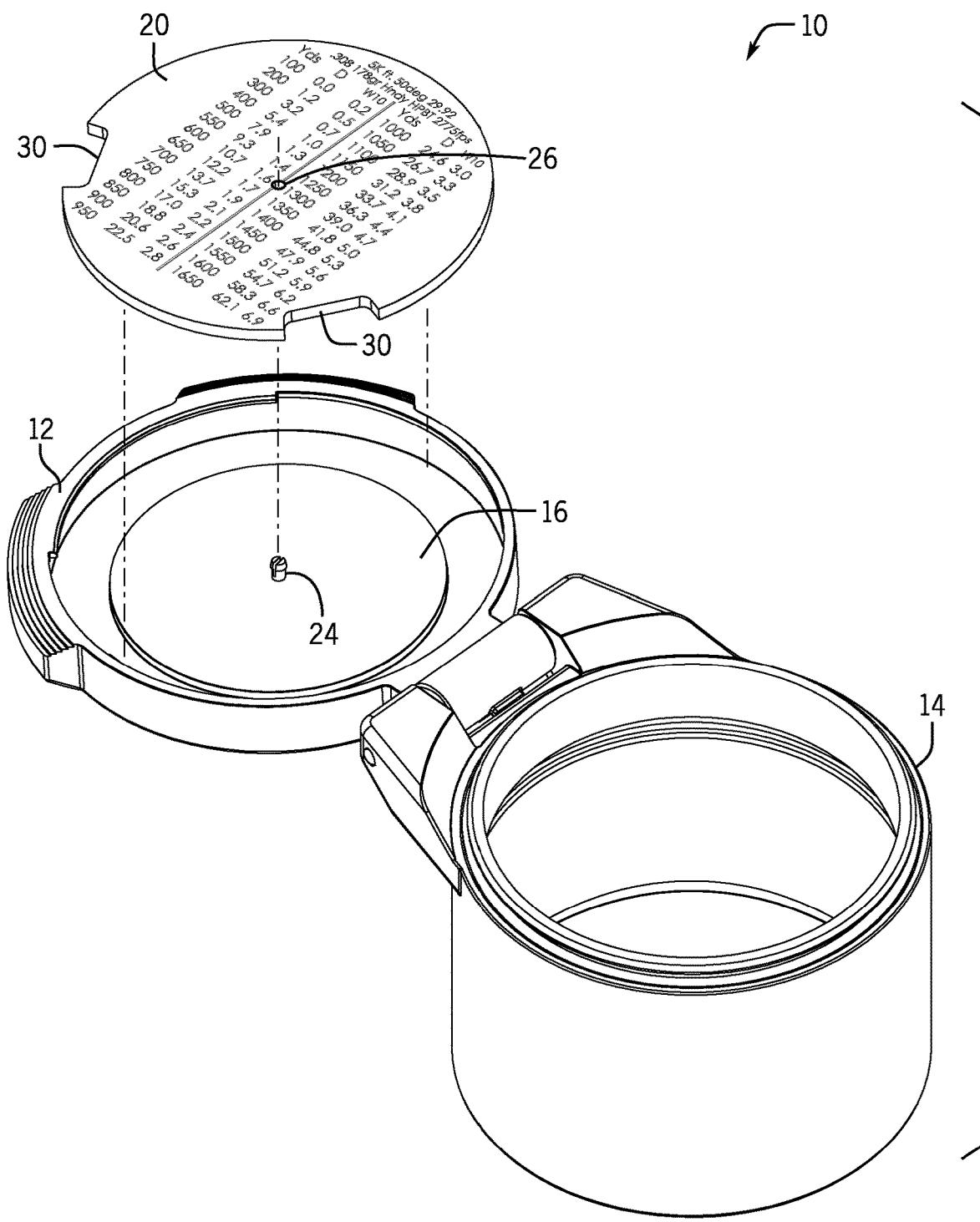
FIG. 8 is an isometric view of another alternative embodiment of an optic cover with the cap open and the display removed.

In another embodiment, the display is held by at least one post 24 of the cap 12. The one or more post(s) 24 could be made from a resilient material and located at the center of the interior portion 16 of the cap 12 as seen in FIG. 8, or located around the circumference of the interior portion 16 of the cap 12 similar to the tabs 22. In the embodiment shown in FIG. 8, the post 24 is slotted and has a top portion with a diameter bigger than the corresponding hole 26 in the display 20. When the display 20 is placed onto the post 24, such that the hole 26 is above the post, and downward pressure is applied, the slot allows the top portion of the post to compress and thereby fit through the hole. After the display 20 is past the top portion, the top portion of the post 24 returns to its original size to thereby hold the display in place. When the display 20 is removed, the upward force applied to the post 24 by the display, causes the top portion of the post to compress to fit back through the hole 26 such that the display is removed.

Figure 9:
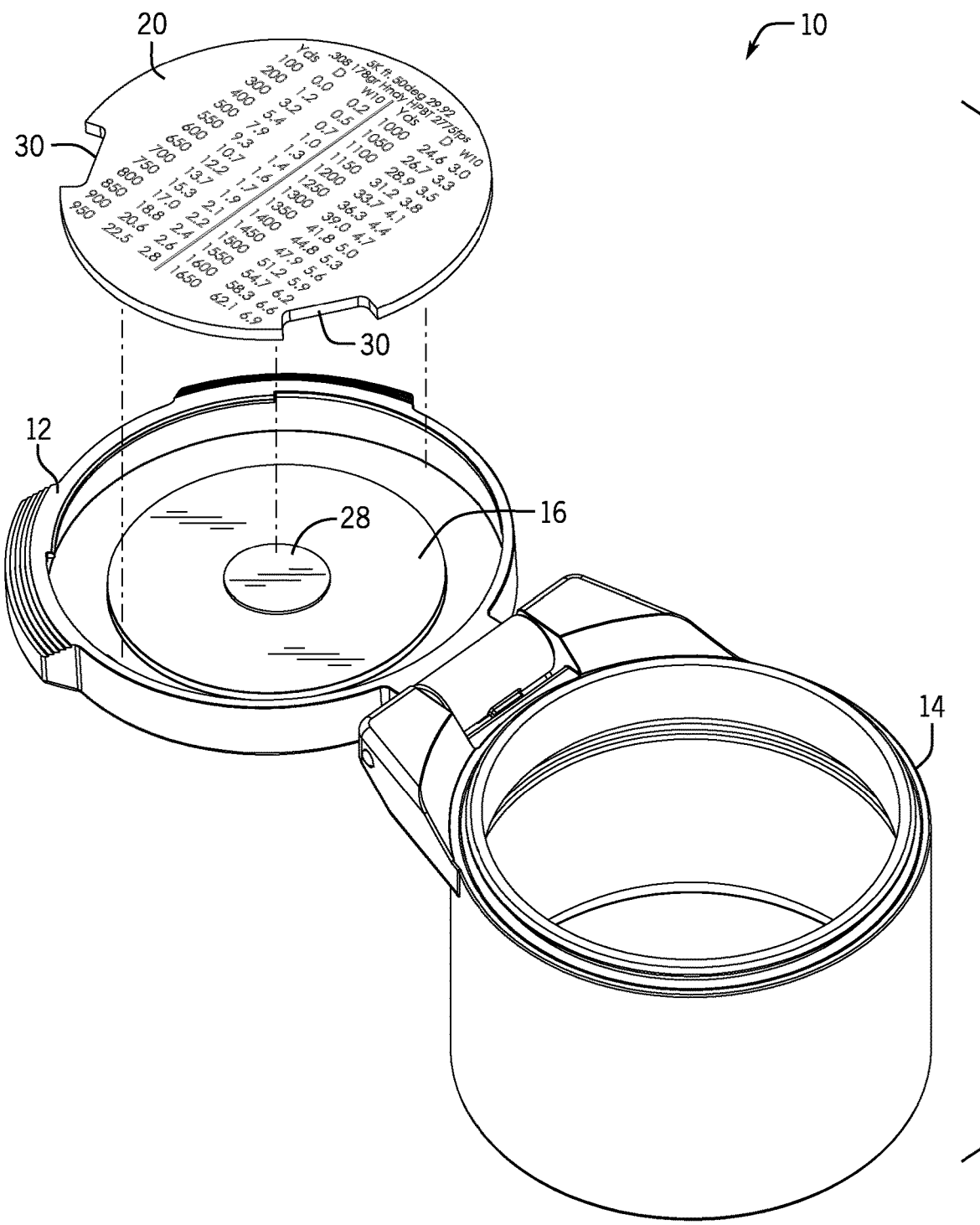
FIG. 9 is an isometric view of another alternative embodiment of an optic cover with the cap open and the display removed.

In yet another embodiment, the display is held by a magnet 28, or magnets, permanently attached to the cap 12 as seen in FIG. 9. The display 20 could be made from a material that is attracted to the magnet(s) 28 or have such a material attached to it.

The retention configurations described above allow the display 20 to be rotated up to 360 degrees while being held by the cap 12. Although such rotation is not necessary, it allows the information shown on the display 20 to be right side up and readable regardless of the shooter's preferred orientation for the cap 12, for example, above the optic device 11 or to the side such as shown in FIG. 3. The resilient retention member configurations described above are also economical to manufacture.

The display 20 includes a means for removing the display from the cap 12. In the embodiment shown in FIG. 10, the display 20 has a number of indents 30 formed in the perimeter of the display. The indents 30 are sized and positioned in the display 20 such that the indents allow the shooter to selectively remove the display from the tabs 22 of the cap 12. In the embodiment shown in FIG. 6, the indents 30 allow the display 20 to be removed by use of a fingernail or the bullet, such as the tip or rim of the casing. Although the embodiment shown in FIG. 6 allows the display 20 to be removed without the use of tools, configurations requiring the use of a tool to release and remove the display 20 from the cap 12 would not defeat the spirit of the invention.

Figure 10:
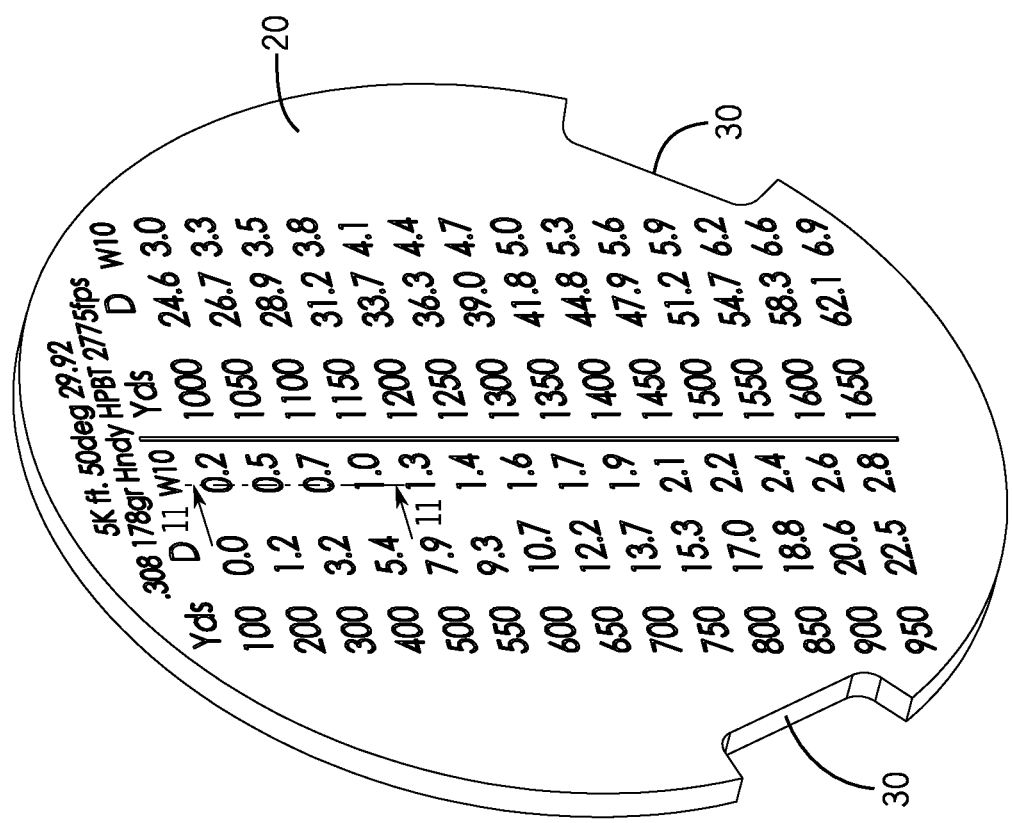
FIG. 10 is an isometric view of a display.

The display 20 should be made of a material that is resistant to environmental conditions such as water, ultraviolet light, heat, cold, etc., as may be experienced while shooting. For example, the display 20 when exposed to moisture, ultraviolet light and/or temperatures in the range from about −20° F. to 120° F. does not substantially deform in its shape or substantially change color so as to affect the performance of the display. The display 20 can also have information permanently affixed thereto or therein as seen in FIG. 10 or have permanent spaces for a shooter to fill in such information or DOPE.

Figure 11:
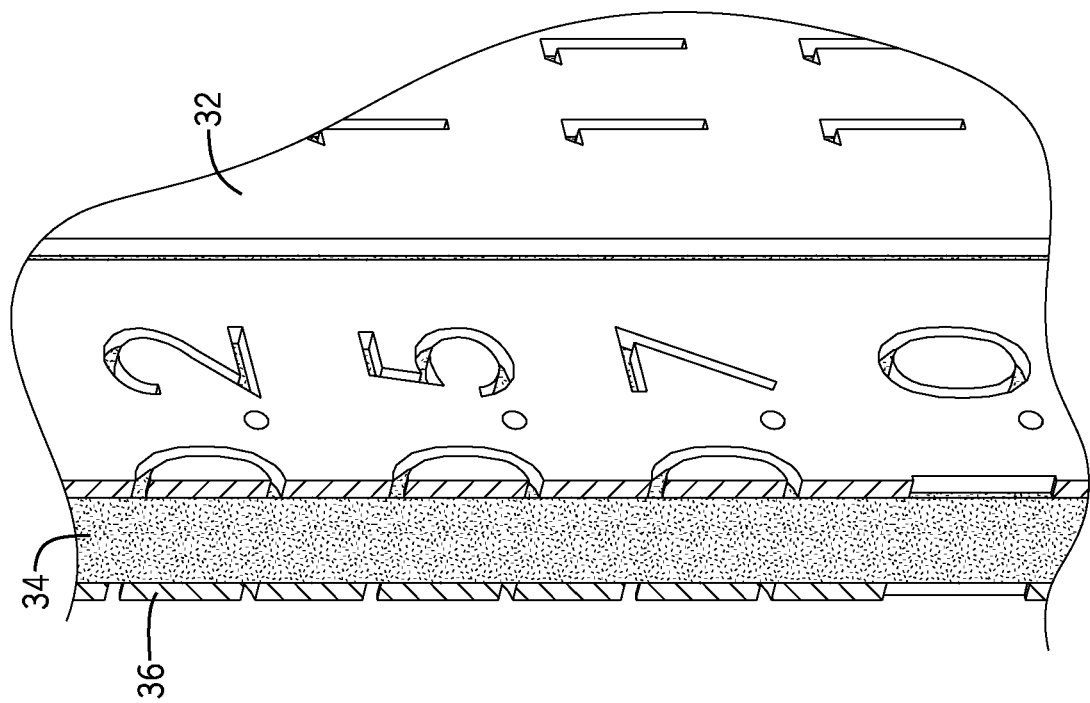
FIG. 11 is an isometric view of a cross section of the display of FIG. 10 taken along the line 11-11.

In one embodiment, the display 20 can be made or formed from layers of plastic coupled or fixed together. As seen in FIG. 11, the display 20 is made from coupling or fixing a top substrate 32 to one side of a middle substrate 34 and coupling or fixing a bottom substrate 36 to another side of the middle substrate. The top and bottom substrates 32, 36 can be thinner than the middle substrate 34 and of a color different than the middle substrate. The top and bottom layers or substrates 32, 36 can be laser engraved so as to remove portions of the top and bottom layers thereby exposing the middle layer or substrate 34 of a different color. Such engravings can also be used to cut the display 20 to the desired size and shape from a larger sheet or sheets of material. Using three layers allows both sides of the display 20 to contain information such as DOPE.

One example of such a display 20 entails using bright yellow outer layers and a black middle layer. The contrast of the yellow and black allows the information, such as shooting information, to be easily conveyed or seen at night as would the use of photo-chromatic material. Other applications or user preferences could suggest different color combinations.

Other numbers of layers can also be used without departing from the spirit of the invention, For example, a two layered display could be made with just the top layer 32 and the middle layer 34, in which case the middle layer 34 would also be the bottom layer. Further, the display 20 could be made from one substrate such as, for example, if the display is made from a material that is attracted to the magnet 28 as seen in FIG. 9. Another example of a single material substrate would be a plastic material that is all one color until used in a laser engraving process; the laser engraver causes the material to change colors such that the engraving is then a different or second color after the engraving process.

Other methods of adding information such as DOPE to a display include, but are not limited to printing on the display, attaching stickers to the display with information printed on the stickers or allowing such information to be written on the stickers by a shooter or allowing a shooter to write directly on the substrate. The use of such methods would not defeat the spirit of the invention.

It is anticipated that a shooter could be carrying multiple displays 20 with different types of information during an activity, for example long range target practice. The shooter could quickly and easily change to a display 20 with the appropriate information for the firearm, bullet and/or environmental conditions being faced at that time.

Figure 12:
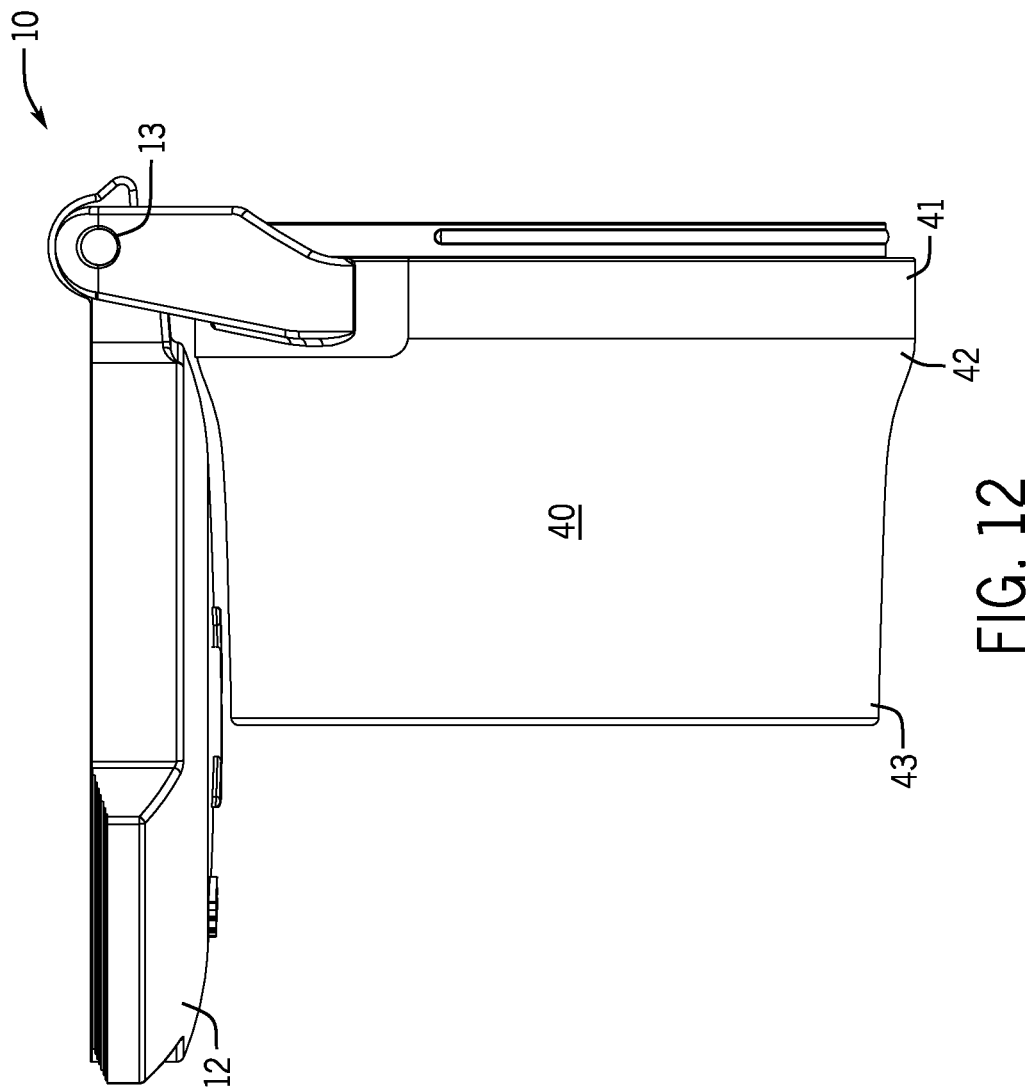
FIG. 12 is an enlarged isometric view of another alternative embodiment of an optic cover with the cap open.
Figure 13:
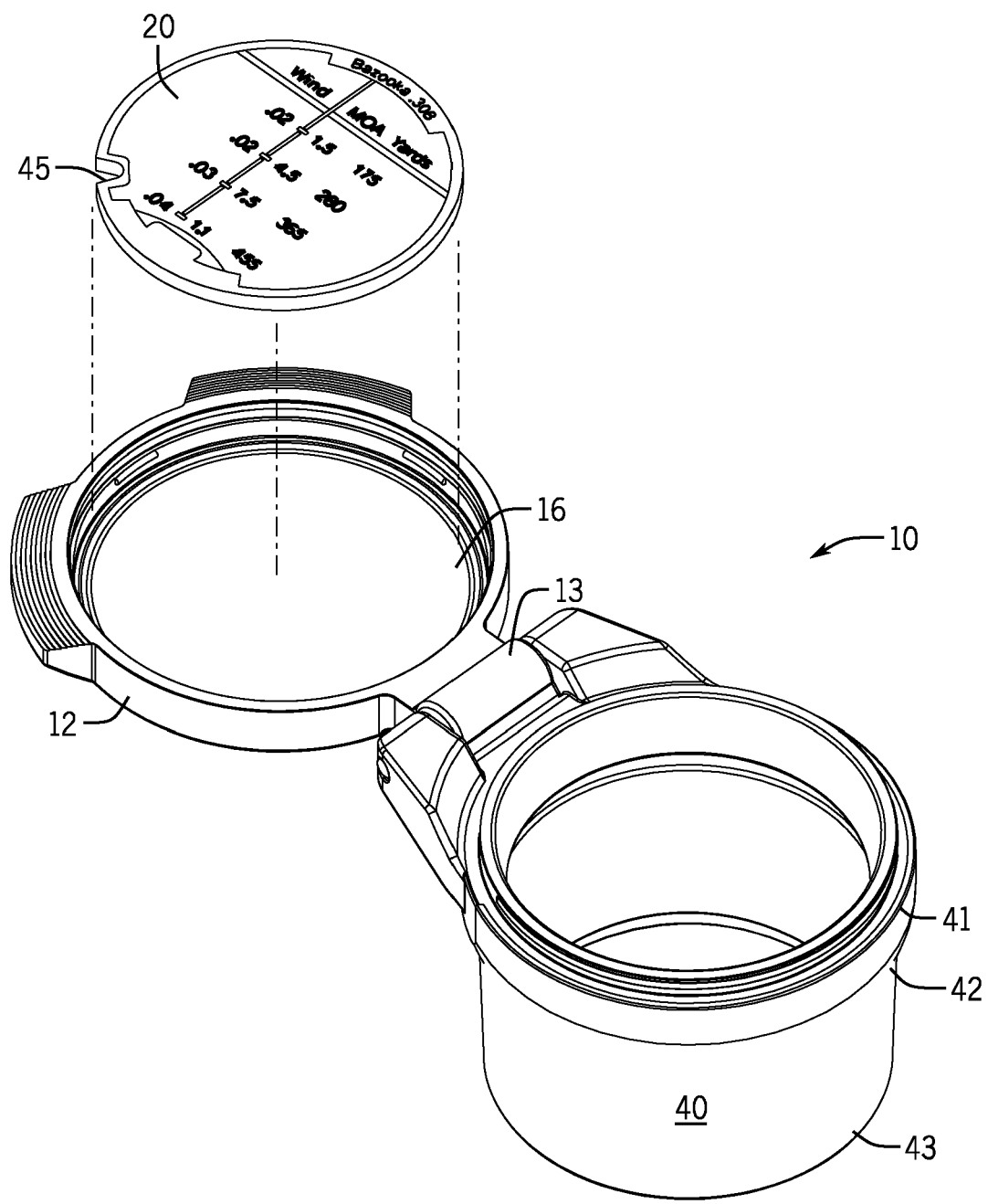
FIG. 13 is an isometric view of the optic cover of FIG. 12 showing the cap open and the display removed.
Figure 14:
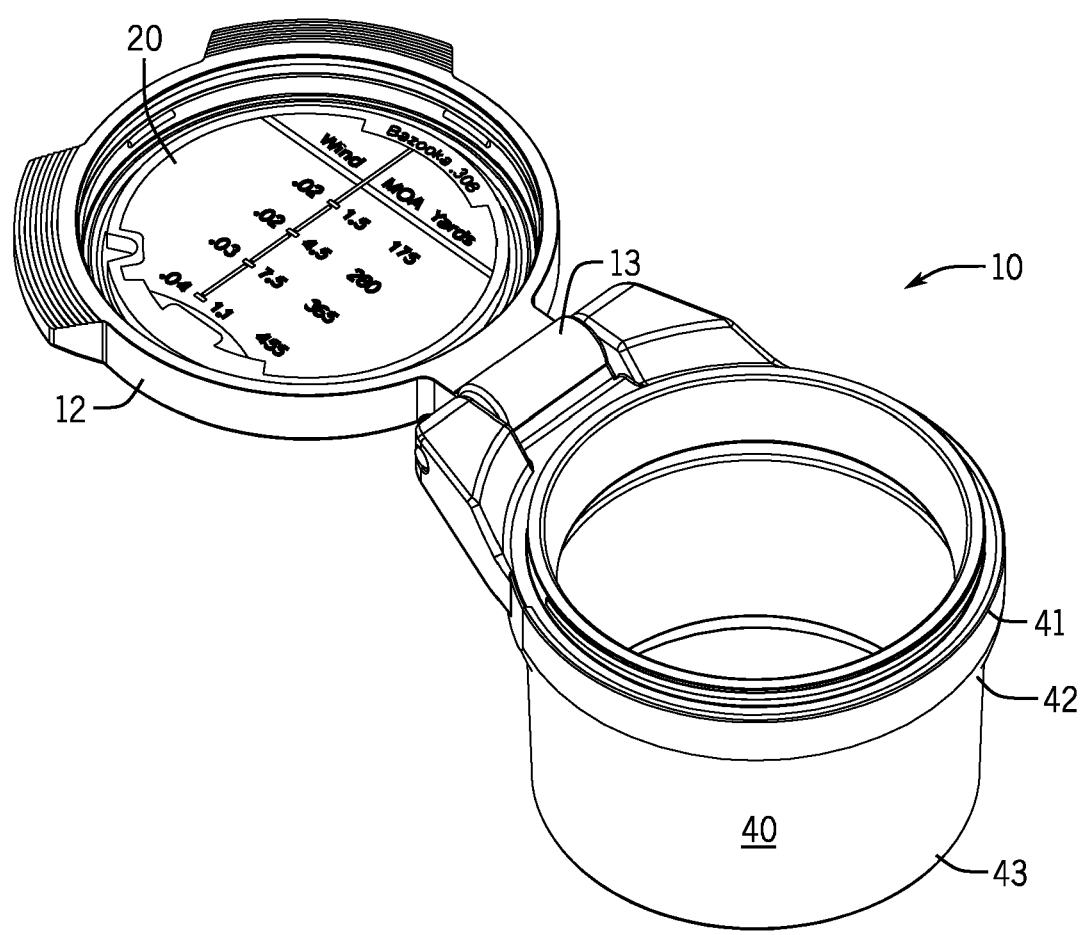
FIG. 14 is an isometric view of the optic cover of FIG. 12 showing the cap open and a display showing certain DOPE data in a reticle style display.
Figure 15:
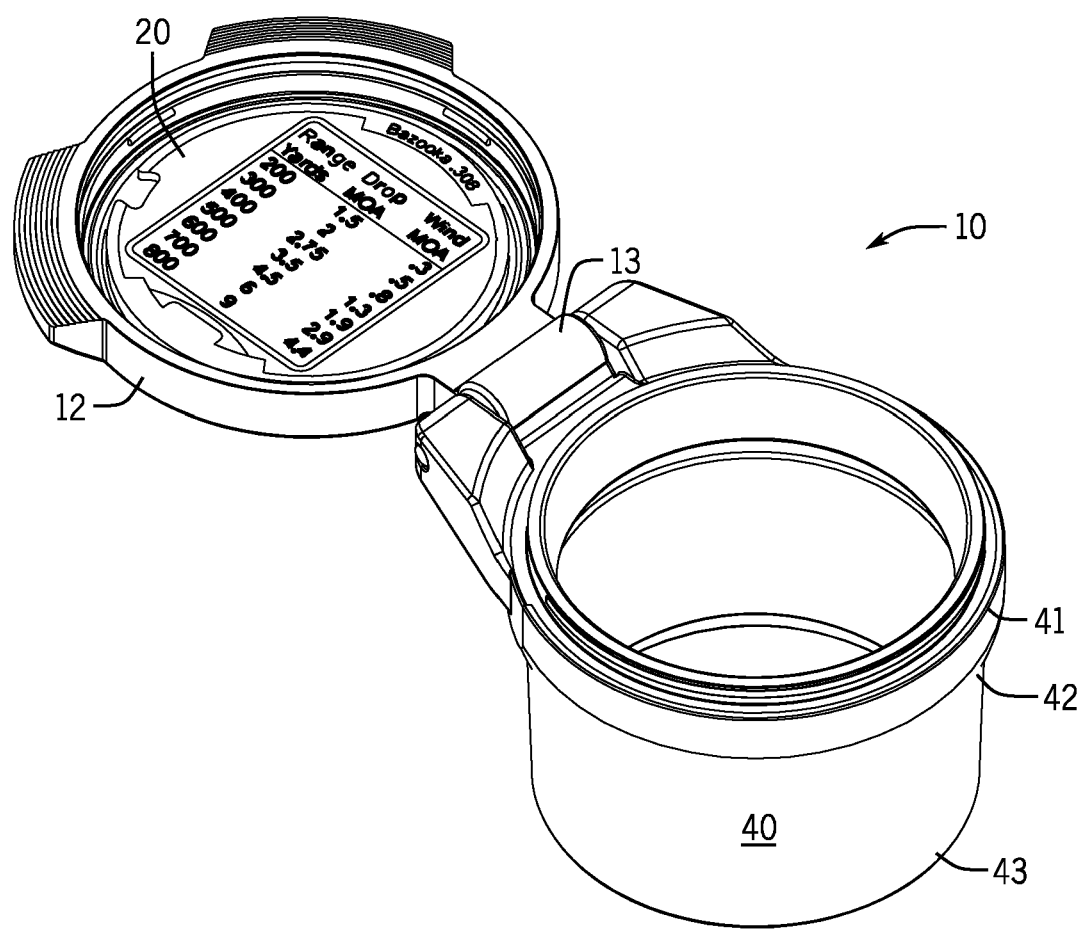
FIG. 15 is an isometric view of the optic cover of FIG. 12 showing the cap open and a different display showing similar DOPE data in a chart format.

An additional embodiment of the invention provides another method for sizing and attaching a cover 10 to an optic device 11, as shown in FIGS. 12 and 13. In this embodiment, the cover 10 includes cap 12, flexible body 40 and ring 41. Cap 12 is sized to complement ring 41, which is operably connected to cap 12 using a suitable means, such as a hinge 13. A display 20 may optionally be fitted within or partially within cap 12; display 20 may be fixed or permanent, or it may be customizable or interchangeable with other displays. It is also possible to use the cover 10 as described herein with no display or with a display that is integral with the cap 12. Flexible body 40 could be any suitable flexible material including, for example, rubber, silicone, or neoprene. Flexible body 40 is functionally attached to a ring 41 and has a first end 42 and a second end 43. In the embodiment drawn in FIGS. 12 and 13, flexible body 40 is molded over ring 41 but other attachment methods could be used as well including adhesives or mechanical fasteners. Also as shown in FIG. 12, the first end 42 of flexible body 40 is wider than the second end 43, and the rubber material it is made from has elastic properties that cause the cover 10 to be securely fitted to optic device 11. As shown in FIG. 13, the display 20 includes one recess 45 that allows the user to selectively remove the display from the cap 12, for example by using the tip of a jackknife, pen or other tool. Exemplary displays 20 are shown in FIGS. 14 and 15.

The flexible body 40 of this embodiment provides several advantages, The stretchiness or elastic properties of the material used can provide for well-fitting covers for a variety of sizes of optics devices. This design also allows for a single cover to fit multiple optic devices because the covers do not need to be precisely sized to the dimensions of the optic device itself. This in turn will allow the cover to fit more sizes of scopes, less choices for consumers, and less SKUs for dealers to carry. The greater flexibility provided may enhance the likelihood that consumers buy the covers 10 for use themselves or as gifts for others. Covers having this design may potentially use less retail space, as retailers may not need to carry a wide variety of sizes. Also, requiring less specificity with the body sizing will likely lead to lower tooling costs and easier manufacturing of the covers.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A cover for an optical device comprising:
   a cap;
   a flexible body; and
   a means for releasably and securely holding a display such that the display can be selectively removed from the means for releasably and securely holding a display, wherein the display is formed by coupling a first substrate to a second substrate and wherein the first substrate is a different color than the second substrate;
   wherein the means for releasably and securely holding a display is permanently attached to the cap.

2. The cover for all optical device of claim 1, wherein the means for releasably and securely holding a display is integrally formed with the cap.

3. The cover for an optical device of claim 1, wherein the cap has an interior portion and the means for releasably and securely holding a display is permanently attached to the interior portion of the cap.

4. The cover for an optical device of claim 1, wherein the means for releasably and securely holding a display is at least two resilient tabs.

5. The cover for an optical device of claim 1, wherein the means for releasably and securely holding a display is at least one resilient post.

6. The cover for an optical device of claim 1, wherein the means for releasably and securely holding a display is at least one magnet.

7. The cover for an optical device of claim 1, wherein the means for releasably and securely holding a display is an annular ridge formed in the cap.

8. The cover for an optical device of claim 1, wherein the display has at least one indent formed therein such that the display may be selectively removed from the means for releasably and securely holding a display by the at least one indent.

9. A cover for an optical device comprising:
   a flexible body capable of attaching the cover to the optical device;
   a cap connected to the body such that the cap can be opened or closed, the cap having an interior portion;
   a display with a perimeter; and
   at least one resilient retention member attached to the interior portion of the cap for retaining the display;
   wherein the display has at least one indent formed in the perimeter such that the display may be released from the at least one resilient retention member at least through the use of the at least one indent, and further wherein the display is formed by coupling a first substrate to a second substrate and wherein the first substrate is a different color than the second substrate.

10. The cover for an optical device of claim 9, wherein the display has at least two sides and data of personal equipment is visible by at least one side of the at least two sides.

11. The cover for an optical device of claim 9, wherein the at least one resilient retention member is a tab.

12. The cover for an optical device of claim 9, wherein the at least one resilient retention member is a post.

13. The cover for an optical device of claim 9, wherein the at least one resilient retention member is an annular ring.

14. The cover for an optical device of claim 9, wherein the display further comprises a third substrate between the first and second substrates.

* * * * *